United States Patent
Yao (10) Patent No.: US 9,240,914 B2
(45) Date of Patent: Jan. 19, 2016

(54) COMMUNICATION SYSTEM WITH FREQUENCY SYNTHESIS MECHANISM AND METHOD OF OPERATION THEREOF

(71) Applicant: Samsung Electronics Co., Ltd., Gyeonggi-Do (KR)

(72) Inventor: Chih-Wei Yao, Sunnyvale, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 17 days.

(21) Appl. No.: 14/152,617

(22) Filed: Jan. 10, 2014

(65) Prior Publication Data

US 2014/0198884 A1 Jul. 17, 2014

Related U.S. Application Data

(60) Provisional application No. 61/752,857, filed on Jan. 15, 2013.

(51) Int. Cl.
*H04B 3/46* (2015.01)
*H04L 27/00* (2006.01)

(52) U.S. Cl.
CPC ..... *H04L 27/0014* (2013.01); *H04L 2027/0016* (2013.01); *H04L 2027/0069* (2013.01)

(58) Field of Classification Search
CPC ...... H04B 1/16; H04L 27/16; H04L 27/0014; H04L 2027/0016; H04L 2027/0069; H03L 7/085; H03L 7/091; G04F 10/005
See application file for complete search history.

(56) References Cited

U.S. PATENT DOCUMENTS

| | | | | |
|---|---|---|---|---|
| 5,815,043 A * | 9/1998 | Chow | ................ | H03K 3/0315 331/108 C |
| 6,525,615 B1 * | 2/2003 | Masenas | ............. | G11B 5/5569 327/159 |
| 8,242,849 B1 * | 8/2012 | Seethamraju et al. | ......... | 331/44 |
| 2004/0041606 A1 * | 3/2004 | Kirsch | ......... | 327/161 |
| 2007/0096836 A1 * | 5/2007 | Lee et al. | ....... | 331/57 |
| 2008/0204092 A1 * | 8/2008 | Moehlmann | ........... | H03L 7/093 327/156 |
| 2010/0085093 A1 * | 4/2010 | Van Der Wel | ............ | H03L 7/07 327/157 |
| 2012/0201289 A1 * | 8/2012 | Abdalla et al. | ............... | 375/233 |

OTHER PUBLICATIONS

R. B. Staszewski et al., "All-digital TX frequency synthesizer and discrete-time receiver for Bluetooth radio in 130-nm CMOS," IEEE J. Solid-State Circuits, vol. 39, No. 12, pp. 2278-2291, Dec. 2004.

(Continued)

*Primary Examiner* — Syed Haider
(74) *Attorney, Agent, or Firm* — IP Investment Law Group (57) ABSTRACT

A communication system includes: a frequency synthesizer, configured to reference a radio frequency (RF) signal, in a device including: a ring oscillator with track-and-hold circuit electrically connected to a reference clock, a bank of comparators, electrically connected to the ring oscillator with track-and-hold circuit, configured to measure a coarse timing, and an analog-to-digital converter, electrically connected to the ring oscillator with track-and-hold circuit, configured to generate a fine timing; a communication interface, electrically connected to the frequency synthesizer, is configured to receive a device transmission; and a control unit, electrically connected to the communication interface, is configured to display a receiver data from the a radio frequency (RF) signal.

20 Claims, 8 Drawing Sheets

(56) References Cited

OTHER PUBLICATIONS

R. B. Staszewski et al., "All-digital PLL and transmitter for mobile phones," IEEE J. Solid-State Circuits, vol. 40, No. 12, pp. 2469-2482, Dec. 2005.

D. Wei et al., "A monolithic low-bandwidth jitter-cleaning PLL with hitless switching for SONET/SDH clock generation," in IEEE Int. Solid-State Circuits Conf. Dig. Tech. Papers, Feb. 2006, pp. 236-237.

A. Thomsen et al., "A fractional-N PLL for SONET-quality clock synthesis applications," in IEEE Int. Solid-State Circuits Conf. Dig. Tech. Papers, Feb. 2007, pp. 58-59.

E. Temporiti, C. Weltin-Wu, D. Baldi, M. Cusmai, and F. Svelto, "A 3.5 GHz wideband ADPLL with fractional spur suppression through TDC dithering and feedforward compensation," IEEE J. Solid-State Circuits, vol. 45, No. 12, pp. 2723-2736, Dec. 2010.

D. Tasca et al., "A 2.9-to-4.0 GHz fractional-N digital PLL with bang-bang phase detector and 560 fs rms integrated jitter at 4.5 mW power," in IEEE Int. Solid-State Circuits Conf. Dig. Tech. Papers, Feb. 2011, pp. 88-89.

C. Hsu, M. Z. Straayer, and M. H. Perrott, "A low-noise wide-BW 3.6-GHz digital fractional-N frequency synthesizer with a noise-shaping time-to-digital converter and quantization noise cancellation," IEEE J. Solid-State Circuits, vol. 43, No. 12, pp. 2776-2786, Dec. 2008.

H. H. Chang, P.-Y. Wang, J.-H. C. Zhan, and B.-Y. Hsieh, "A fractional spur-free ADPLL with loop-gain calibration and phase-noise cancellation for GSM/GPRS/EDGE," in IEEE Int. Solid-State Circuits Conf. Dig. Tech. Papers, Feb. 2008, pp. 200-201.

M. Lee, M. E. Heidari, and A. A. Abidi, "A low-noise wideband digital phase-locked loop based on a coarse-fine time-to-digital converter with sub picosecond resolution," IEEE J. Solid-State Circuits, vol. 44, No. 10, pp. 2808-2816, Oct. 2009.

C.-W. Yao, L. Lin, B. Nissim, H. Arora, and T. Cho, "A low spur fractional-N digital PLL for 802.11 a/b/g/n/ac with 0.19 ps rms jitter," in VLSI Symp. Dig. Tech. Papers, Jun. 2011, pp. 110-111.

C.-W. Yao and Alan N. Willson, Jr., "A 2.8-3.2 GHz fractional-N digital PLL with ADC-assisted TDC and inductively coupled fine-tuning DCO," IEEE J. Solid-State Circuits, vol. 48, No. 3, Mar. 2013.

M. Z. Straayer and M. H. Perrott, "A multi-path gated ring oscillator TDC with first-order noise shaping," IEEE J. Solid-State Circuits, vol. 44, No. 4, pp. 1089-1098, Apr. 2009.

M. Z. Straayer, "Noise-shaping techniques for analog and time-to-digital converters using voltage controlled oscillators," Ph.D. dissertation, Dept. Electr. Eng. and Comput. Sci., Mass. Inst. Technol., Cambridge, MA, 2008.

M. Choi and A. A. Abidi, "A 6-b 1.3-Gsample/s A/D converter in 0.35-um CMOS," IEEE J. Solid-State Circuits, vol. 36, No. 12, pp. 1847-1858, Dec. 2001.

C.-C. Liu et al., "A 10b 100MS/s 1.13mW SAR ADC with binary-scaled error compensation," in IEEE Int. Solid-State Circuits Conf. Dig. Tech. Papers, Feb. 2010, pp. 386-387.

\* cited by examiner

COMMUNICATION SYSTEM WITH FREQUENCY SYNTHESIS MECHANISM AND METHOD OF OPERATION THEREOF

CROSS REFERENCE TO RELATED APPLICATION(S)

This application claims the benefit of U.S. Provisional Patent Application Ser. No. 61/752,857 filed Jan. 15, 2013, and the subject matter thereof is incorporated by reference herein.

TECHNICAL FIELD

An embodiment of the present invention relates generally to a communication system, and more particularly to a system for optimizing a frequency synthesis for optical, wireless, and wired communication systems.

BACKGROUND

Modern communication systems rely on precise frequency synthesis of the main operating frequencies defined in currently accepted standards. A core technique for modern communication systems is frequency (and/or clock) synthesis, which generates a variable clock of a desired frequency based on a frequency reference clock, such that stability, accuracy, and spectral purity of the variable clock correlate with performance of the frequency reference clock. In a transmitter, the variable clock provided by a local frequency synthesizer can be utilized as a local oscillation carrier for an up-conversion frequency translation from baseband or intermediate-frequency (IF) signals to radio frequency (RF) signals. On the other hand, in a receiver, the variable clock provided by a local frequency synthesizer can be adopted as a local oscillation carrier for a down-conversion from RF signals to IF/baseband signals.

All frequency based communication requires a reference frequency for interpreting and transmitting the communication signal. The communication can be via optical network, wireless network, or wired network. All of the communication infrastructure is based on fixed reference frequencies for operating our cell phones, audio and video communication, emergency radios, and core communication networks.

Personal communication devices that utilize Global System for Mobile (GSM) Communication, Wideband Code Division Multiple Access (WCDMA), or fourth generation Long-Term Evolution (4G LTE) all require precise frequency synthesis at their given frequency with stringent suppression of spurs in the frequency spectrum. Issues such as these can limit the application to certain circuitry within the personal communication devices and can contribute to excessive power use in the devices.

Thus, a need still remains for a communication system with frequency synthesis mechanism to improve communication reliability and power conservation. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system that includes: a device comprising a frequency synthesizer, configured to reference a radio frequency (RF) signal, including: a ring oscillator with track-and-hold circuit electrically connected to a reference clock, a bank of comparators, electrically connected to the ring oscillator with track-and-hold circuit, configured to measure a coarse timing, and an analog-to-digital converter, electrically connected to the ring oscillator with track-and-hold circuit, configured to generate a fine timing; a communication interface, electrically connected to the frequency synthesizer, is configured to receive a device transmission; and a control unit, electrically connected to the communication interface, is configured to display a receiver data from the a radio frequency (RF) signal.

An embodiment of the present invention provides a method of operation of a communication system including: synthesizing an output frequency, in a device, for referencing a radio frequency (RF) signal including: enabling a ring oscillator with track-and-hold circuit by a reference clock, accessing a bank of comparators for measuring a coarse timing from the reference clock, and generating a fine timing by enabling an analog-to-digital converter (ADC) electrically connected to the ring oscillator with track-and-hold circuit; receiving a device transmission by referencing a communication interface with the output frequency; and displaying a receiver data, from the radio frequency (RF) signal, by a control unit.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION

An embodiment of the present invention provides a device comprising a frequency synthesizer utilizing a time-to-digital converter (TDC) assembly with an analog-to-digital (ADC) gain tracking circuit and a TDC gain tracking circuit to remove the effects of gain shift based on variations in process, voltage, and temperature (PVT). The use of the TDC gain tracking circuit and the ADC gain tracking circuit can reduce the TDC error power by 11.5 dB and can reduce a fractional spur at 400 kHz offset by 30 dB. The reduction in the TDC error power and the fractional spurs are sufficient to allow the use of the time-to-digital converter (TDC) assembly in cellular transceivers. The TDC assembly can reduced receiver PLL power consumption, because a PLL bandwidth can be widened to reduce a phase noise contribution of the digital controlled oscillator (DCO), and therefore, the DCO can also be designed to consume lower power. The TDC assembly can be used in a transmit phase-lock loop to reduce local oscillator (LO) pulling.

An embodiment of the present invention provides the device comprising the frequency synthesizer utilizing the TDC assembly in which the sequence of the voltage input line can measure linear time segments. Each of the voltage input line that detects a full sweep can reflect the coarse timing and the one instance of the voltage input line that the voltage below a full transition and in the linear region of the output of the multi-input inverter with track-and-hold circuit can be analyzed by the ADC portion for providing the fine timing. The interpolated delay cells and isolation resistors can provide averaging circuits to generate a voltage value in the holding capacitors that is a linear function of the time measured by the TDC unit.

An embodiment of the present invention provides the device comprising the frequency synthesizer utilizing the TDC assembly in which the adjusted timing count can provide a gain adjusted measure of the fine timing by applying a time averaged adjustment to minimize the low frequency portion of the TDC error. This aspect of the embodiment can provide a cancelling of the integral non-linearity associated with the ring oscillator with track-and-hold circuit for providing a stable and consistent frequency synthesizer for the device.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "adder" referred to herein is a circuit formed of hardware components used for summing signals without directly joining the individual instances of the signals.

Figure 1:
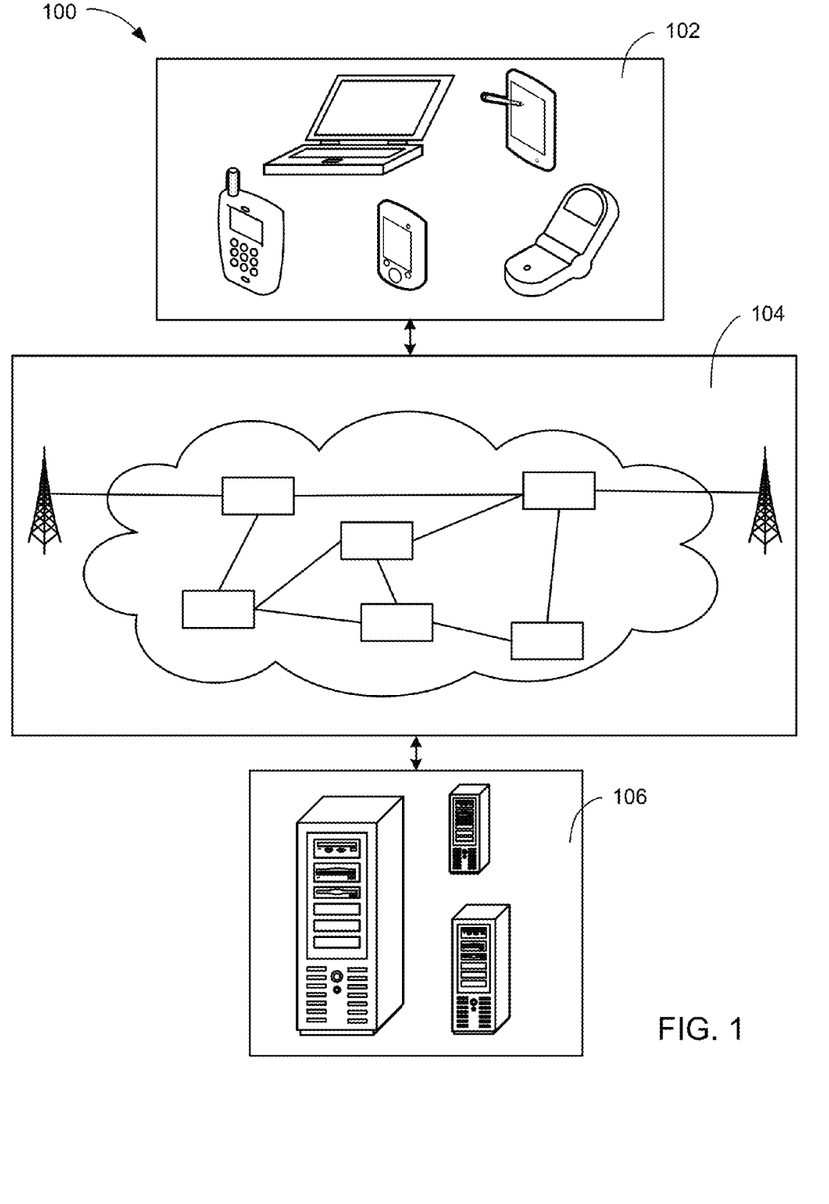
FIG. 1 is a communication system with frequency synthesis mechanism in an embodiment of the present invention.

Referring now to FIG. 1, therein is shown a communication system 100 with frequency synthesis mechanism in an embodiment of the present invention. The communication system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of communication devices, such as a cellular phone, personal digital assistant, a notebook computer, or an entertainment device. The first device 102 can couple, either directly or indirectly, to the communication path 104 to communicate with the second device 106 or can be a stand-alone device.

For illustrative purposes, the communication system 100 is described with the first device 102 as a communication device, although it is understood that the first device 102 can be different types of devices. For example, the first device 102 can also be a device for communicating images or a multi-media presentation. A multi-media presentation can be a presentation including sound, a sequence of streaming images or a video feed, or a combination thereof. As an example, the first device 102 can be a high definition television, a computer tablet, a computer monitor, a personal digital assistant, a cellular phone, an optical driver, an optical receiver, or a multi-media phone. In another example, the first device 102 can be a signal receiver for receiving broadcast or live stream signals, such as a television receiver, a cable box, a satellite dish receiver, or a web enabled device.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a server, a recording device, such as a camera or video camera, or a combination thereof.

The second device 106 can be centralized in a single room, distributed across different rooms, distributed across different geographical locations, or embedded within a telecommunications network. The second device 106 can couple with the communication path 104 to communicate with the first device 102.

For illustrative purposes, the communication system 100 is described with the second device 106 as a computing device, although it is understood that the second device 106 can be different types of devices. Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
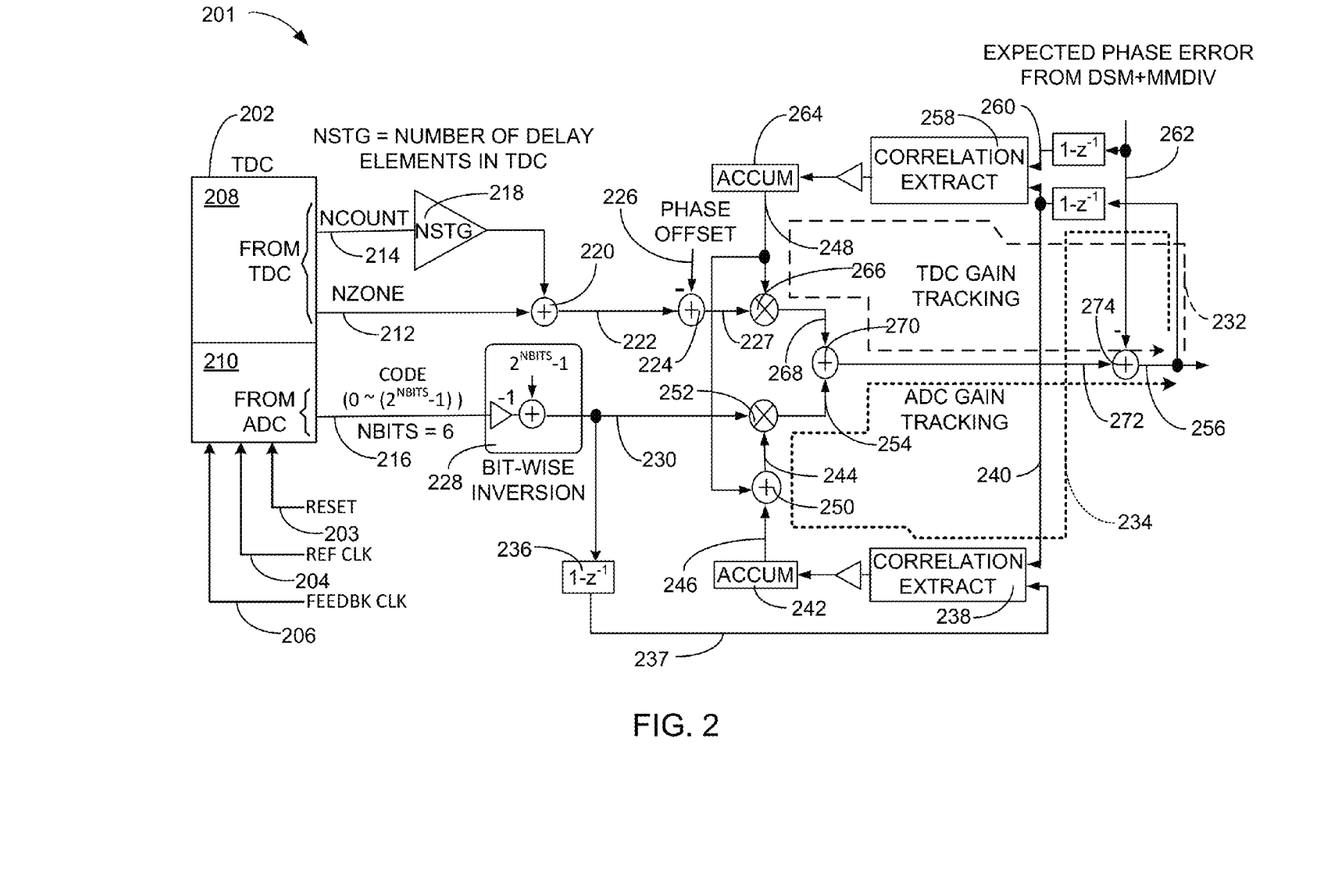
FIG. 2 is an exemplary block diagram of a time-to-digital converter (TDC) assembly of the communication system.

Referring now to FIG. 2, therein is shown an exemplary block diagram of a time-to-digital converter (TDC) assembly 201 of the communication system 100. The exemplary block diagram of a time-to-digital converter (TDC) assembly 201 depicts a time-to-digital converter (TDC) unit 202, such as an analog-to-digital converter (ADC) assisted time-to-digital converter (TDC). The time-to-digital converter (TDC) unit 202 can measure the time between a reference frequency and an Nth division of a synthesized output frequency. A reset line 203 can initialize the time-to-digital converter (TDC) unit 202. The reset line 203 can be asserted for a minimum duration between measurements by the TDC unit 202. The TDC unit 202 can measure the time between a transition of a reference clock 204 and a feedback clock 206 with precision of less than one picosecond. The time-to-digital converter (TDC) unit 202 can include a two-step conversion, in which a TDC portion 208 can determine a coarse measurement and an analog-to-digital converter (ADC) portion 210 can detect a residue voltage, from a final partial clock, for performing a fine measurement.

The TDC portion 208 can provide a zone identification 212, such as a number of a delay element within the TDC portion 208, indicating which has of the delay elements within the TDC portion will be analyzed by the ADC portion 210. The TDC portion 208 can also provide a cycle count 214, indicating a number of internal cycles the TDC portion 208 has counted.

The ADC portion 210 can be activated by the TDC portion 208 in order to evaluate a time delay of the residue voltage that represents a partial cycle determined by the TDC portion 208. The ADC portion 210 can generate a digital code 216, such as the amplitude of the residue voltage.

The cycle count 214 indicates the number of cycles generated by the TDC portion 208 during the measurement of an input sample. Each incremental step in cycle count 214 indicates longer incremental measured time than each incremental step in the zone identification 212. As a result, the cycle count 214 needs to be properly scaled by a synchronizing buffer 218 before the result is combined with the zone identification 212 with an adder 220. The required scaling factor for the synchronizing buffer 218 is the number of the delay elements triggered in the TDC portion 208. The combined result is the coarse timing 222. A phase adjust adder 224 can combine the coarse timing 222 and a negative phase offset 226. The negative phase offset 226 is added to adjust the sign of the coarse timing 222 because the TDC unit 202 only monitors the timing between the reference clock 204 and the feedback clock 206 without determining which arrived first. As such, the coarse timing 222 must be adjusted by the negative phase offset 226 to generate a signed coarse timing 227 in order be useful in the frequency synthesis process.

The ADC portion 210 can provide the digital code 216 as a scaled value of the residue voltage. A bit-wise inversion unit 228 can adjust the timing of generating a fine timing 230. The bit-wise inversion unit 228 can generate the fine timing 230 to be combined with the signed coarse timing 227.

Since the digital logic within the TDC portion 208 and the ADC portion 210 is subject to gain variations based on process, voltage, and temperature (PVT), a TDC gain tracking circuit 232 and an ADC gain tracking circuit 234 can make adjustments to maintain the performance of the time-to-digital converter (TDC) assembly 201. The ADC gain tracking circuit 234 can receive input from a difference unit 236, which can filter the fine timing 230 in order to allow only an ADC delta value 237 to pass to a correlation extraction unit 238.

The correlation extraction unit 238 can compare the relationship of the ADC delta value 237 to a timing adjustment delta value 240. The correlation extraction unit 238 can continuously monitor the performance of the ADC portion 210 and provide apparent gain changes in the ADC delta value 237 to a fine timing accumulator 242.

A fine timing scaling factor 244 can be generated from a fine timing delta 246 and a coarse timing delta 248 that are combined by an ADC adjustment adder 250. An ADC adjust multiplier 252 can apply the fine timing scaling factor 244 to the fine timing 230. The ADC adjust multiplier 252 can provide a gain adjusted fine timing 254.

The additional logic of the ADC gain tracking circuit 234, including the difference unit 236, the correlation extraction unit 238, the fine timing accumulator 242, the ADC adjustment adder 250, and the ADC adjust multiplier 252, can compensate for changes in the performance of the ADC portion 210 due variations in voltage and temperature. The ADC gain tracking circuit 234 can work in conjunction with the TDC gain tracking circuit 232 to remove the effects of gain variations based on PVT.

The TDC gain tracking circuit 232 can monitor a coded measured timing 256 by generating the timing adjustment delta value 240 through an instance of the difference unit 236. The timing adjustment delta value 240 can reflect the incremental changes in value of the coded measured timing 256. A coarse timing extraction unit 258 can monitor the relationship of the timing adjustment delta value 240 and an expected phase error delta 260. The coarse timing extraction unit 258 monitors for any changes in the relationship between the coded measured timing 256 and an expected phase error 262. Any incremental changes in the gain detected by the coarse timing extraction unit 258 can be added to a coarse timing accumulator 264 for generating the coarse timing delta 248.

A TDC adjust multiplier 266 can compensate for changes in the performance of the TDC portion 208 due variations in voltage and temperature. The TDC adjust multiplier 266 can multiply the signed coarse timing 227 by the coarse timing delta 248 for producing a gain adjusted coarse timing 268. A total timing adder 270 can combine the gain adjusted fine timing 254 and the gain adjusted coarse timing 268 for generating a gain adjusted measured timing 272.

A correlation adder 274 can subtract the expected phase error 262 from the gain adjusted measured timing 272 in order to generate the coded measured timing 256. The coded measured timing 256 can be used in to adjust the actual timing between the reference clock 204 and the feedback clock 206.

It has been discovered that the ADC gain tracking circuit 234 can work in conjunction with the TDC gain tracking circuit 232 to remove the effects of gain variations based on PVT. The addition of the TDC gain tracking circuit 232 and the ADC gain tracking circuit 234 can reduce the TDC error power by 11.5 dB and can reduce a fractional spur at 400 kHz offset by 30 dB. The reduction in power in TDC error power and the fractional spurs are sufficient to allow the use of the time-to-digital converter (TDC) assembly 201 in cellular transceivers, which require fractional spur levels below −70 dB for proper operation. The TDC assembly 201 can reduce the received PLL power consumption, because a PLL bandwidth can be widened to reduce a digital controlled oscillator (DCO) phase noise contribution, and therefore, the DCO can be designed to consume lower power. The TDC assembly 201 can be used in a transmit phase-lock loop to reduce local oscillator (LO) pulling.

Figure 3:
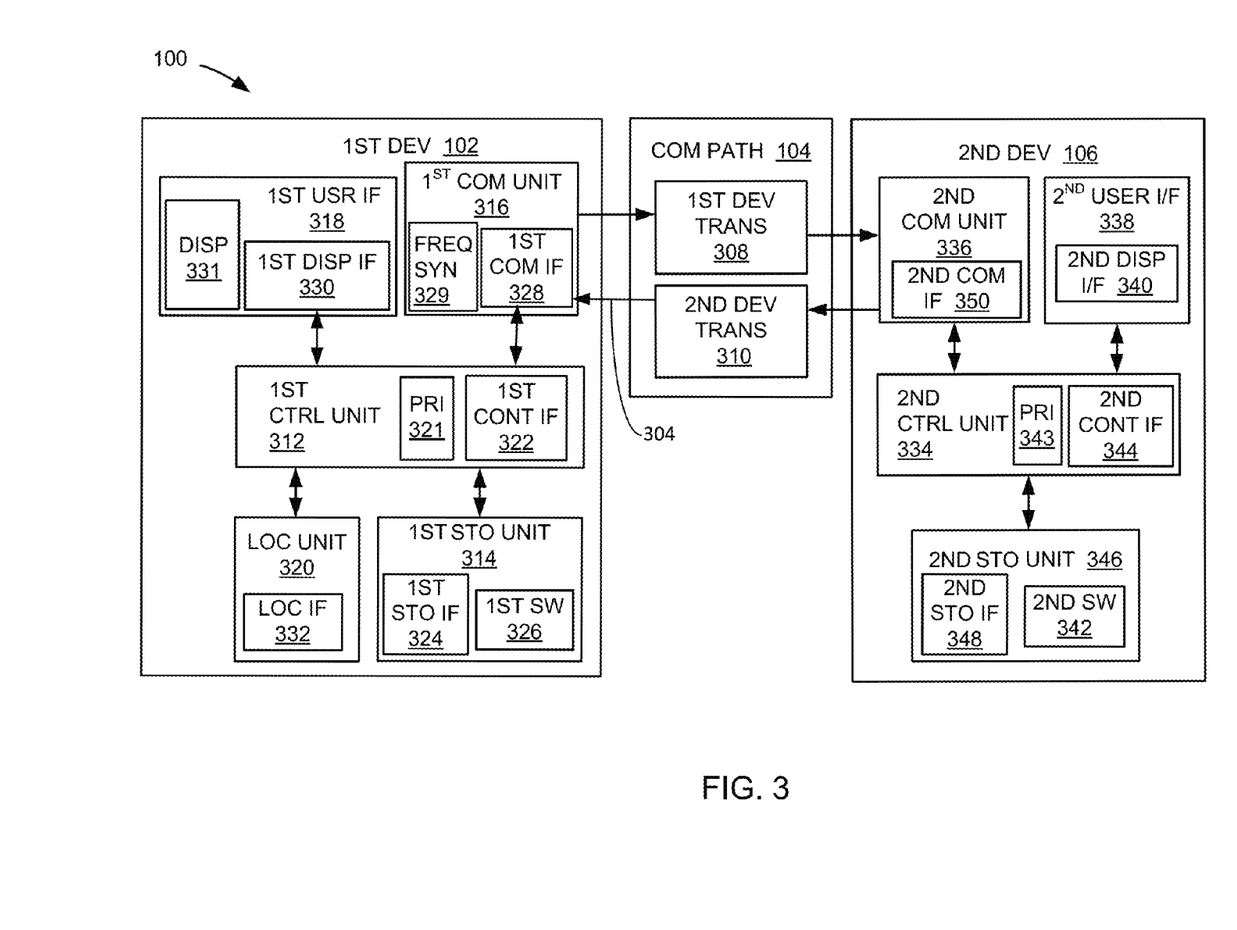
FIG. 3 is an exemplary block diagram of the communication system with frequency synthesis mechanism in an embodiment of the present invention.

Referring now to FIG. 3, therein is shown an exemplary block diagram of the communication system 100 with frequency synthesis mechanism in an embodiment of the present invention. The communication system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively.

The first device 102 can send information in a first device transmission 308 over the communication path 104 to the second device 106. The second device 106 can send information in a second device transmission 310 over the communication path 104 to the first device 102.

For illustrative purposes, the communication system 100 is shown with the first device 102 as a client device, although it is understood that the communication system 100 can have the first device 102 as a different type of device. For example, the first device 102 can be a server.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 312, a first storage unit 314, a first communication unit 316, a first user interface 318, and a location unit 320. The first device 102 can be of any of a variety of mobile devices, such as a cellular phone, personal digital assistant, a notebook computer, automotive telematic navigation system, or other multifunctional mobile communication or entertainment device. The first device 102 can be a standalone device, or can be incorporated with a vehicle, for example a car, truck, bus, or train.

The first control unit 312 can include a first message priority module 321 and a first control interface 322. The first control unit 312 can be implemented in a number of different manners. For example, the first control unit 312 can be a processor, an embedded processor, a microprocessor, hardware control logic, a hardware finite state machine (FSM), a digital signal processor (DSP), or a combination thereof.

The first message priority module 321 can be implemented in different ways and can include hardware gates, software routines, processors, combinational logic, or a combination thereof. The first message priority module 321 can monitor all communication events received through the first communication unit 316. The first communication unit 316 can receive the communication events which include e-mails, text messages, telephone calls, instant messages, voice over Internet protocol (VOIP) messages, or a combination thereof. The first message priority module 321 can generate a statistical priority for each of the communication events, received by the first communication unit 316, for later processing.

The first message priority module 321 can be electrically connected to the first control interface 322. The first message priority module 321 can access the first storage unit 314 through the first control interface 322 for storing the statistics related to each of the communication events received from the first communication unit 316.

The first control interface 322 can be implemented in different ways and can include different implementations depending on which functional units or external units are being interfaced with the first controller interface 322. For example, the first controller interface 322 can be implemented with a pressure sensor, an inertial sensor, a micro electro-mechanical system (MEMS), optical circuitry, waveguides, wireless circuitry, wireline circuitry, or a combination thereof.

The first storage unit 314 can include a first storage interface 324. The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage interface 324 can be can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first controller interface 322. A first software 326 can be stored in the first storage unit 314.

The first communication unit 316 can have a first communication interface 328, including a direct-conversion radio-frequency (RF) receiver or a zero-IF receiver. The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication interface 328 can be used for communication between the first communication unit 316 and other functional units in the first device 102. The first communication interface 328 can receive information from the communication path 104. The coupling between the first communication interface 328 and the communication path 104 can be through a wireless radio-frequency (RF) transmission. A frequency synthesizer 329, such as a digital phase-lock loop, configured to generate a radio frequency (RF) reference for receiving the radio frequency (RF) signal 304 through the first communication interface 328 from the communication path 104 and for transmitting information to the communication path 104 through the first communication unit 316.

It is understood that the frequency synthesizer 329 can provide additional clock frequencies as required by the first device 102. The frequency synthesizer 329 can include the time-to-digital converter (TDC) assembly 201 of FIG. 2 in order to meet the requirements for reduced power consumption while providing precise resolution and linearity.

The first communication interface 328 can include a low noise amplifier, a mixer, a phase filter circuit, an I/Q imbalance circuit, and a digital signal processing block. The first communication interface 328 can extract a usable signal from the wireless radio-frequency (RF) transmission received from the communication path 104.

The first communication interface 328 can include different implementations depending on which functional units are being interfaced with the first communication unit 316. The first communication interface 328 can be implemented with technologies and techniques similar to the implementation of the first controller interface 322.

The first user interface 318 can include a first display interface 330. The first user interface 318 can include an input device and an output device. Examples of the input device of the first user interface 318 can include a keypad, a touchpad, soft-keys, a keyboard, a microphone, or any combination thereof to provide data and communication inputs. Examples of the output device of the first user interface 318 can include the first display interface 330. The first display interface 330 can include a display device 331. Examples of the display device 331 can include a projector, a video screen, a speaker, a touch screen, or any combination thereof.

The location unit 320 can include a location interface 332. The location unit 320 can be implemented in many ways. For example, the location unit 320 can function as at least a part of a global positioning system (GPS), an inertial navigation system, a cellular-tower location system, a pressure location system, or any combination thereof.

The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first controller interface 322.

The second device 106 can be optimized for implementing the embodiment of the present invention in a multiple device embodiment with the first device 102. The second device 106 can provide the additional or higher performance processing power compared to the first device 302. The second device 106 can include a second control unit 334, a second communication unit 336, and a second user interface 338.

The second user interface 338 allows a user (not shown) to interface and interact with the second device 306. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the communication system 300. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 300, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second message priority module 343 and a second controller interface 344. The second controller interface 344 can be used for communication between the second control unit 334 and other functional units in the second device 106. The second controller interface 344 can also be used for communication that is external to the second device 106.

The second message priority module 343 can be implemented in different ways and can include hardware gates, software routines, processors, combinational logic, or a combination thereof. The second message priority module 343 can assist the first message priority module 221 in calculating the priority of the communication events sent to the first device 102.

The second message priority module 343 can calculate a message priority in support of the first message priority module 321. The second message priority module 343 can combine any of the communication events sent by a single user in order to calculate the overall priority of the communication event.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a micro electro-mechanical system (MEMS), optical circuitry, waveguides, wireless circuitry, wireline circuitry, or a combination thereof.

A second storage unit 346 can store the second software 342. The second storage unit 346 can also store the relevant information, such as contact lists, caller identifications, established groups, recorded messages, response options, priority of the communication events, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 300 is shown with the second storage unit 346 as a single hierarchy storage system, although it is understood that the communication system 300 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the second control unit 334 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104. The second communication unit 336 can receive the communication events which include e-mails, text messages, telephone calls, instant messages, voice over Internet protocol (VOIP), or a combination thereof on behalf of the first device 102 when the first device 102 is unavailable.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The communication system 300 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. In addition, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 300 is described by operation of the first device 102 and the second device 106. It is understood that the first device 102 and the second device 106 can operate any of the modules and functions of the communication system 100. For example, the first device 102 is described to operate the location unit 320, although it is understood that the second device 106 can also operate the location unit 320.

Figure 4:
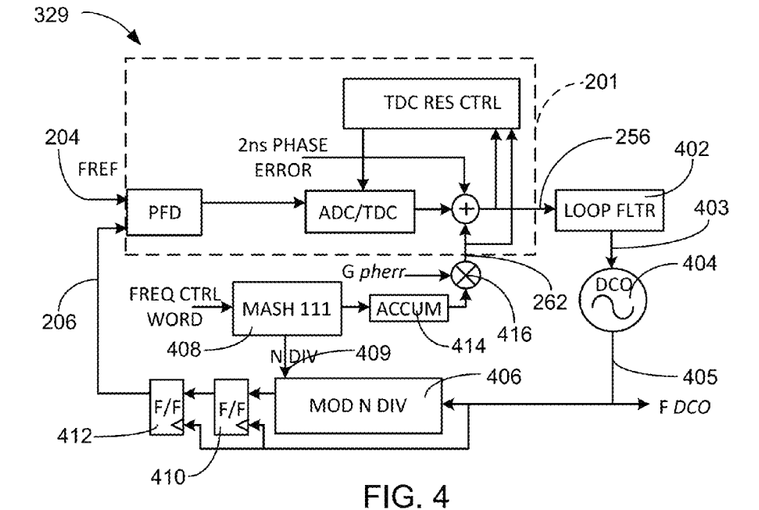
FIG. 4 is an exemplary block diagram of an embodiment of the frequency synthesizer utilizing the time-to-digital converter (TDC) assembly.

Referring now to FIG. 4, therein is shown an exemplary block diagram of an embodiment of the frequency synthesizer 329 utilizing the time-to-digital converter (TDC) assembly 201. The exemplary block diagram of the frequency synthesizer 329 includes a loop filter 402 electrically connected to the coded measured timing 256. The loop filter 402, such as a second order digital loop filter, can pass a digital control word 403 to a digitally controlled oscillator (DCO) 404. The digital control word 403 can cause the DCO 404 to increase or decrease an output frequency 405.

The feedback clock 206 can be generated by processing the output frequency 405 through a modulo-N divider 406. The delay variation in the output of the modulo-N divider 406 could cause noise folding to increase the in-band phase-noise floor. In order to address this issue a first retiming flip-flop 410 and a second retiming flip-flop 412 can be used to resynchronize the feedback clock 206 to the output frequency 405. The first retiming flip-flop 410 can reduce the jitter to a few picoseconds and the second retiming flip-flop 412 can reduce the jitter to less than one picosecond.

A delta-sigma modulator (DSM) 408, such as a MASH111 DSM, can provide a divide control word 409 to the modulo-N divider 406. The DSM 408 can assist in the reduction of fractional spurs in the spectrum of the output frequency 405. A residue from the DSM 408 can be can be collected in a phase error accumulator 414 to scale phase error through a phase error multiplier 416 to generate the expected phase error 262 for adjusting the coded measured timing 256.

It is understood that the implementation of the frequency synthesizer 329 is an example only and other implementations are possible. The application of the time-to-digital converter (TDC) assembly 201 can greatly reduce the integral non-linearity (INL) of the frequency synthesizer 329.

Figure 5:
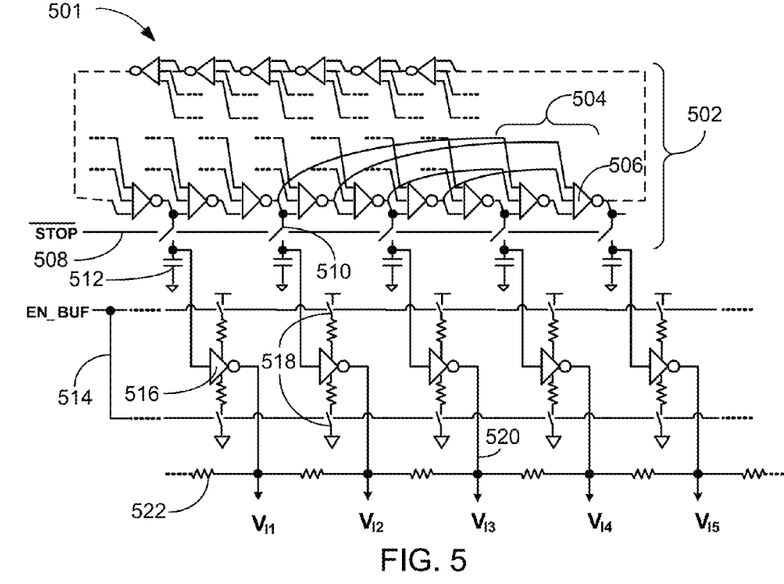
FIG. 5 is an exemplary circuit diagram of interpolated delay cells in conjunction with a ring oscillator with track-and-hold circuit of the time-to-digital converter (TDC) unit of FIG. 2.

Referring now to FIG. 5, therein is shown an exemplary circuit diagram of interpolated delay cells 501 in with the realization of a ring oscillator with track-and-hold circuits 502 of the time-to-digital converter (TDC) unit 202 of FIG. 2. The ring oscillator with track-and-hold circuits 502 can be composed of daisy chain of interpolated delay cells 504, each composed of two or more of a multi-input inverter with track-and-hold circuit 506, such as a three input inverter with track-and-hold circuit. The daisy chain of the interpolated delay cells 504 can be formed in a loop, having an odd number of the interpolated delay cells 504. Each of the interpolated delay cells 504, that forms the ring oscillator with track-and-hold circuits 502, can be coupled to a sampling switch 510 and a resistively degenerated buffer 516 linked together by interpolation resistors 522. The resulting structure can be realized as a ring oscillator with track-and-hold circuit.

A stop line 508 can control the sampling switch 510 electrically connected to the output of each of the interpolated delay cells 504. While the sampling switch 510 is closed any voltage present at the output of each of the interpolated delay cells 504 will charge a holding capacitor 512. When the stop line 508 is asserted, each of the holding capacitors 512 will hold the charge that was present just before the stop line 508 was asserted.

In sequence, when the stop line 508 is asserted, an enable buffer line 514 can assert power to the resistively degenerated buffer 516 for each of the delay cells 504 by actuating a pair of power switches 518 for each of the resistively degenerated buffer 516. The assertion of the enable buffer line 514 can cause the output of the resistively degenerated buffer 516 to replicate the voltage level that is stored in the holding capacitor 512.

Each of the output of the resistively degenerated buffer 516 can be electrically connected to a voltage input line 520 that can be used to measure a time between an activation of the ring-oscillator with track-and-hold circuits 502 and the assertion of the stop line 508. Each of the voltage input line 520 can be electrically connected to two adjacent instances of the voltage input line 520 by the interpolation resistors 522. The interpolation resistors 522 can provide a current path between the instances of the voltage input line 520 when the enable buffer line 514 is negated.

It is understood that the interconnection of the multi-input inverter with track-and-hold circuit 506 within each of the interpolated delay cells 504 is not shown for simplicity of the explanation. Some of the interconnection of the multi-input inverter with track-and-hold circuit 506 are shown by way of an example. The sequence of the voltage input line 520 can comprise instance "0" through instance "N" and can be read by the time-to-digital converter (TDC) unit 202 of FIG. 2 for determining a number of cycles between the activation of the ring-oscillator with track-and-hold circuits 502 and the assertion of the stop line 508. At least one of the voltage input line 520 can indicate a voltage below a full transition and in the linear region of the output of the multi-input inverter with track-and-hold circuit 506 as reflected by the voltage in the holding capacitor 512. The voltage input line 520 having the voltage below a full sweep and in the linear region of the output of the multi-input inverter with track-and-hold circuit 506 can be evaluated by the analog-to-digital converter (ADC) portion 210 of FIG. 2.

It has been discovered that the sequence of the voltage input line 520 can measure linear time segments for each of the voltage input line 520 that detects a full sweep can reflect the coarse timing 222 of FIG. 2 and the one instance of the voltage input line 520 that the voltage below a full transition and in the linear region of the output of the multi-input inverter with track-and-hold circuit 506 can be analyzed by the ADC portion 210 for providing the fine timing 230 of FIG. 2. The interpolated delay cells 504 and interpolation resistors 522 can provide averaging circuits to generate a voltage value in the holding capacitors 512 that is a linear function of the time measured by the TDC unit 202.

Figure 6:
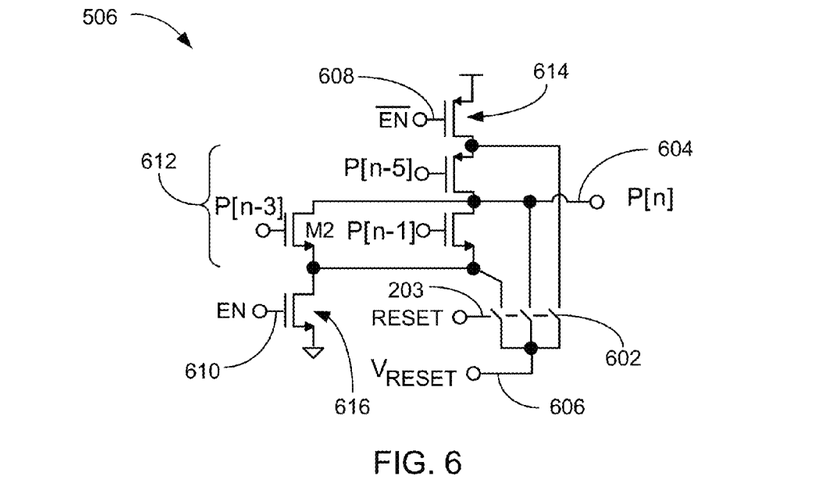
FIG. 6 is an exemplary circuit of the three input inverter with track-and-hold circuit of the ring oscillator with track-and-hold circuit of FIG. 5.

Referring now to FIG. 6, therein is shown an exemplary circuit of the multi-input inverter with track-and-hold circuit 506 of the ring-oscillator with track-and-hold circuits 502 of FIG. 5. The exemplary circuit of the multi-input inverter with track-and-hold circuit 506 depicts a reset switch 602 controlled by the reset line 203 for initializing an inverter output 604. The reset switch 602 can force the inverter output 604 to a reset voltage 606. In the implementation of the ring-oscillator with track-and-hold circuits 502, each instance of the multi-input inverter with track-and-hold circuit 506 can have a different voltage level applied for initialization of the ring-oscillator with track-and-hold circuits 502. The reset switch 602 is only activated when a low enable 608 and a high enable 610 are inactive.

The inactive state of the low enable 608 and the high enable 610 can disconnect the multi-input inverter with track-and-hold circuit 506 from its source power. When the low enable 608 and the high enable 610 are asserted, the multi-input inverter with track-and-hold circuit 506 will switch from the pre-loaded reset voltages in the previous stages of the ring-oscillator with track-and-hold circuits 502. A set of switching inputs 612 can be driven by the inverter output 604 of previous stages in the ring-oscillator with track-and-hold circuits 502.

By way of an example, if the inverter output 604 is for the Nth instance of the multi-input inverter with track-and-hold circuit 506 in the ring-oscillator with track-and-hold circuits 502, the switching inputs 612 can be electrically connected to the inverter output 604 of the multi-input inverter with track-and-hold circuit 506 that are in position N−1, N−3, and N−5. This coupling provides that each of the switching inputs 612 is in the same phase of switching.

When the low enable 608 and the high enable 610 are negated, a positive isolation transistor 614 and a negative isolation transistor 616 turn off, allowing the charge on the inverter output to be captured by the holding capacitors 512 of FIG. 5 until it is read out by the TDC unit 202 of FIG. 2. Since the inverter output 604 of every other instance of the multi-input inverter with track-and-hold circuit 506 used in the ring-oscillator with track-and-hold circuits 502 is isolated from the holding capacitors 512, it is necessary to assert the reset voltage 606 to all of the inverter outputs 604 prior to a next measurement.

It is understood that the multi-input inverter with track-and-hold circuit 506 is an example only and other configurations of the inverter element is possible. A two input inverter or a four input inverter are possible without changing the operation of the ring-oscillator with track-and-hold circuits 502 or the communication system 100 of FIG. 1.

Figure 7:
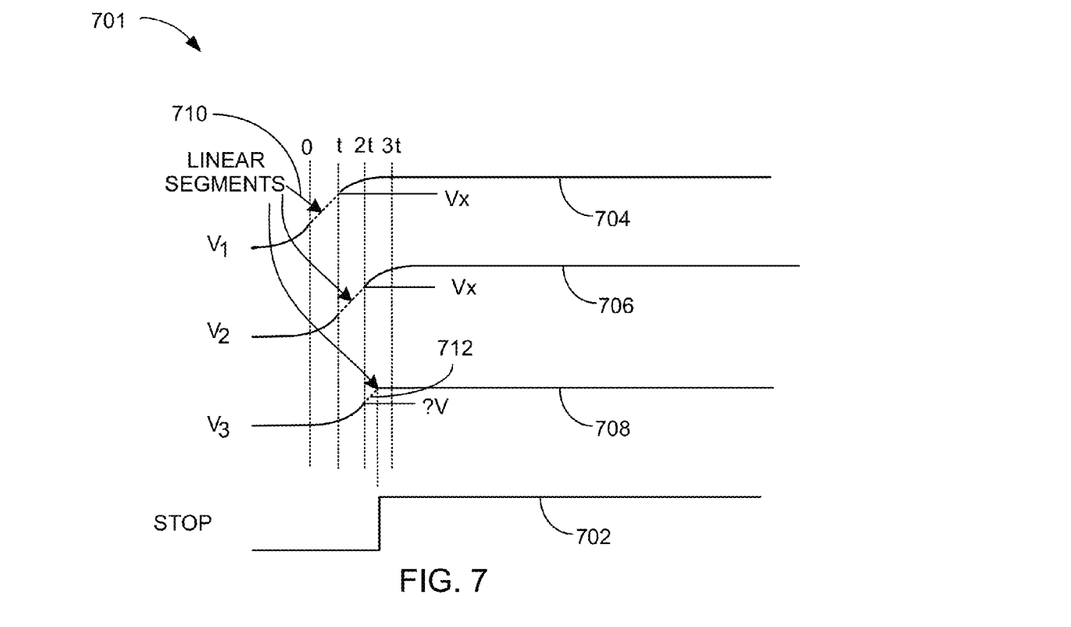
FIG. 7 is an exemplary timing diagram of voltage patterns detected by the feedback capacitors of FIG. 5 as a stop is asserted.

Referring now to FIG. 7, therein is shown an exemplary timing diagram of voltage patterns 701 detected by the holding capacitors 512 of FIG. 5 as a stop 702 is asserted. The exemplary timing diagram of the voltage patterns 701 depicts the stop 702 that marks the end of the timing measure cycle. A first voltage waveform 704 can reflect the voltage present on the inverter output 604 of FIG. 6 as reflected by a first instance of the holding capacitor 512. A second voltage waveform 706 can reflect the voltage present on the inverter output 604 as reflected by a second instance of the holding capacitor 512. A third voltage waveform 708 can reflect the voltage present on the inverter output 604 as reflected by a third instance of the holding capacitor 512. The third voltage waveform 708 is abbreviated by the assertion of the stop 702. The third voltage waveform 708, as captured by the holding capacitor 512, reflects the fractional cycle of the interpolated delay cells 504 of FIG. 5 that was halted by the assertion of stop 702.

Each of the first voltage waveform 704, the second voltage waveform 706, and the third voltage waveform 708 can have a linear segment 710, having a fixed slope, in each transition between low and high. The linear segment 710 of the first voltage waveform 704 ends as the linear segment 710 of the second voltage waveform 706 begins. This abutment of the linear segments 710 continues for each of the holding capacitors 512 in the ring-oscillator with track-and-hold circuits 502 of FIG. 5.

At an instant that the stop 702 is asserted, reference voltages of the multi-input inverter with track-and-hold circuit 506 of FIG. 5 are removed leaving the charge on the inverter output 604 fixed with no discharge path. The TDC unit 202 of FIG. 2 can detect each of the holding capacitors 512 that has reached saturation and can count them as full transitions for the coarse timing 222 of FIG. 2. A single instance of the holding capacitors 512 can detect a partial transition 712 as shown in the third voltage waveform 708.

The partial transition 712 can be analyzed by the ADC portion 210 of FIG. 2 for generating the fine timing 230 of FIG. 2. Since the slope of the linear segment 710 is fixed, the time required to traverse the slope to a ΔV of the partial transition 712 can easily be determined. The calculation of the time required to traverse the partial transition 712 for providing the fine timing 230 is the only responsibility of the ADC portion 210. The added precision of the fine timing 230 greatly improves the accuracy of the TDC unit 202.

Figure 8:
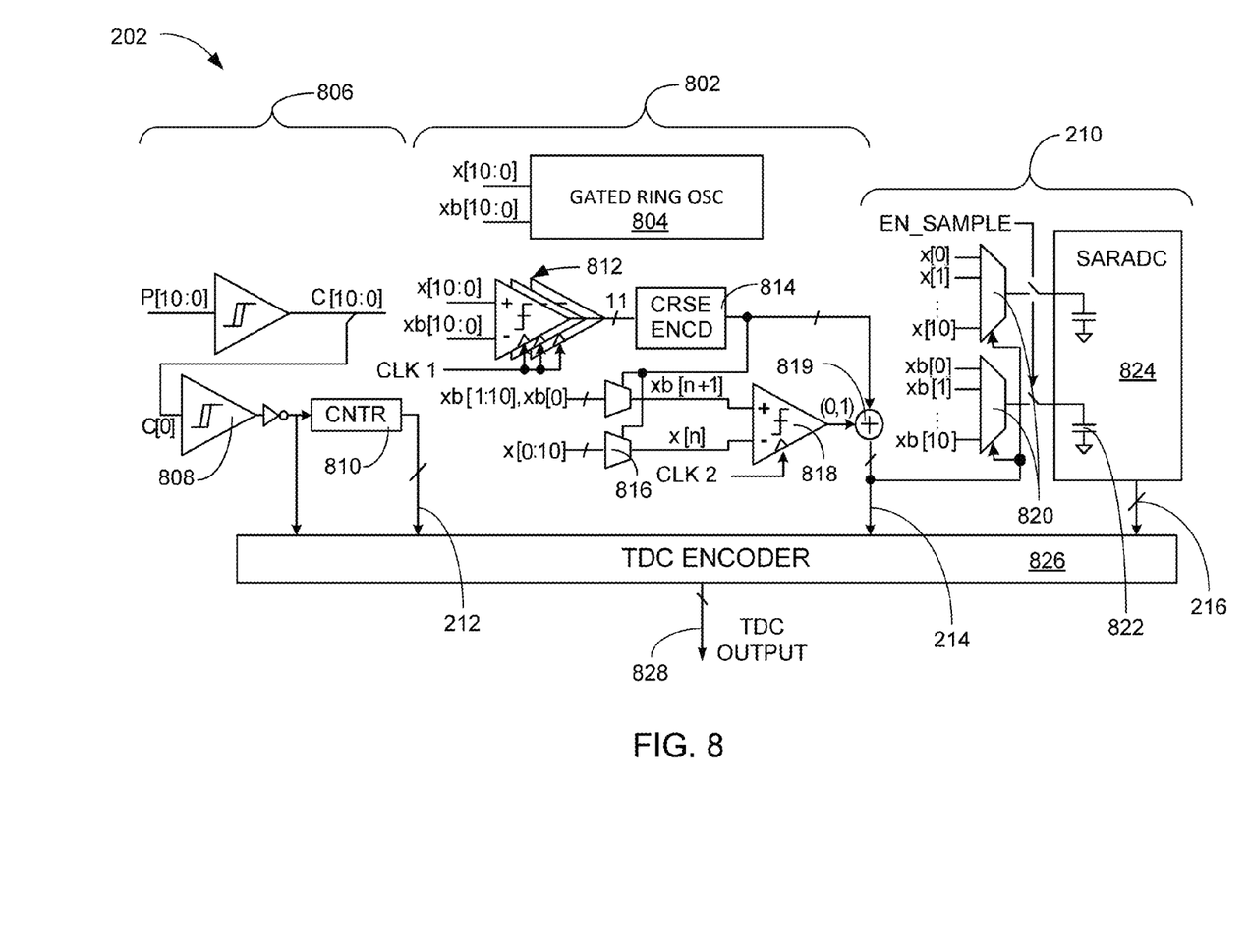
FIG. 8 is an exemplary block diagram of the time-to-digital converter (TDC) unit of FIG. 2.

Referring now to FIG. 8, therein is shown an exemplary block diagram of the time-to-digital converter (TDC) unit 202 of FIG. 2. The exemplary block diagram of the time-to-digital converter (TDC) unit 202 depicts a coarse timing unit 802 including a ring oscillator with track-and-hold circuit 804, such as an eleven stage interpolated ring-oscillator, having a resistive averaging circuit (not shown) for generating the complimentary outputs (xb 10:0) from resistive interpolation. The ring oscillator with track-and-hold circuit 804 can be composed of a series connection of the interpolated delay cells 504 of FIG. 5 in any number selected for the ring.

A zone identification unit 806 can monitor the inverter output 604 of FIG. 6 within the ring oscillator with track-and-hold circuit 804 for determining a count of full cycles detected by the holding capacitors 512 of FIG. 5. A clock buffer 808, such as a Schmitt trigger buffer, can couple to a counter 810 for determining how many complete cycles have been detected. The output of the counter 810 can be the zone identification 212, which will determine the coarse timing 222 of FIG. 2. This can be significant because the particular set of the multi-input inverter with track-and-hold circuit 506 of FIG. 5, holding capacitor 512 of FIG. 5, the resistively degenerated buffer 516 of FIG. 5, and the interpolation resistors 522 of FIG. 5 can be biased by temperature and voltage variations. By keeping track of the individual zones and the amount of offset error they generate, an adjustment can be performed to correct the offset error before transmitting the fine timing 230 of FIG. 2.

A bank of comparators 812 converts the differential values from the ring oscillator with track-and-hold circuit 804 into digital values for a coarse encoding unit 814. Based on the result, two of the 11 nodes representing negative-to-positive transition are selected by an encoded selector 816. The negative value node is denoted as node n, and the positive value node is denoted as node n+1.

If the negative node n is node 10, then n+1 is wrapped back to node 0. In the second step, an offset compensated comparator 818 checks the relative values of xb[n+1] and x[n]. Since nodes n and node n+1 have similar common mode values, xb[n+1] captures the negative of the absolute magnitude of node n+1 and x[n] captures the negative of the absolute magnitude of node n. If xb[n+1]>x[n], node n+1 has smaller absolute magnitude and node n+1 is selected. If xb[n+1]<=x[n], node n has smaller or equal absolute magnitude and node n is selected. This step ensures that the input the ADC portion 210 processes the partial transition 712 of FIG. 7. The output of the coarse encoder 814 and the offset compensated comparator 818 are combined by a coarse adder 819 for assembling the cycle count 214.

An analog selection multiplexer 820 can be addressed by the output of the coarse encoding unit 814 and the offset compensated comparator 818 for passing the positive and negative phases of the node selected by the offset compensated comparator 818. The voltage levels passed by the analog selection multiplexer 820 can charge a pair of storage capacitors 822, such as 20 femto-farad single-ended capacitors. The storage capacitors 822 can also serve as the charge redistribution digital-to-analog converter (DAC) for an analog-to-digital converter 824, such as a successive approximation register analog-to-digital converter (SARADC).

The analog-to-digital converter 824 can perform a successive approximation of the analog value held in the storage capacitors 822. The digital code 216, provided by the analog-to-digital converter 824, can be combined with the cycle count 214 and the zone identification 212 by a TDC encoder 826 for providing a high-resolution timing measure 828.

It is understood that the time-to-digital converter (TDC) unit 202 can have other implementations. The identification and analysis of the partial transition 712 can provide additional accuracy and precision to the timing measure between the reference clock 204 of FIG. 2 and the feedback clock 206 of FIG. 2.

Figure 9:
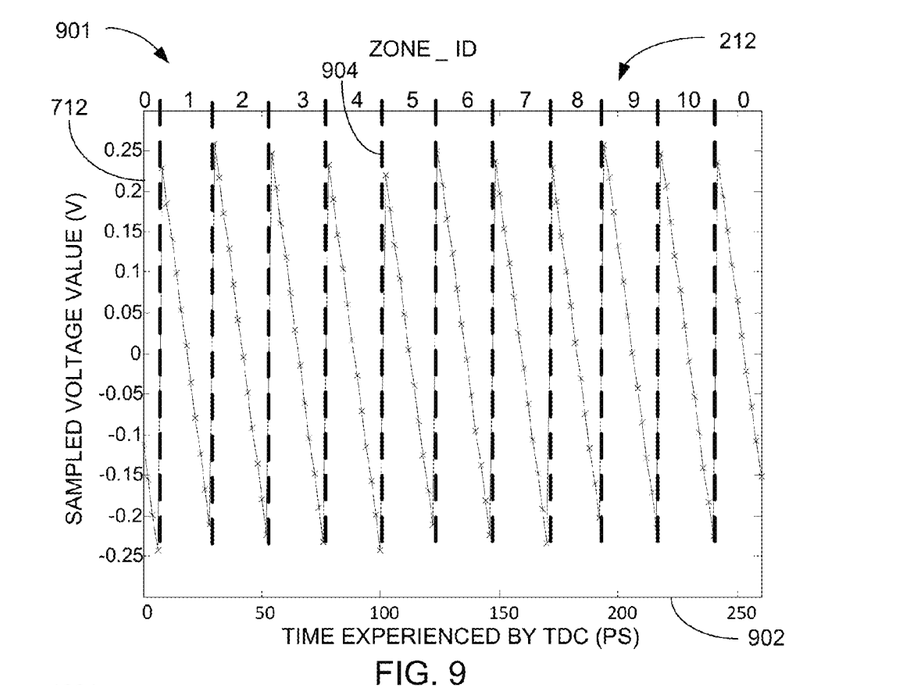
FIG. 9 is an exemplary trace of a TDC output time versus sample voltage of the partial transition of FIG. 7.

Referring now to FIG. 9, therein is shown an exemplary trace 901 of a TDC output time 902 versus sample voltage of the partial transition 712 of FIG. 7. The exemplary trace 901 of the TDC output time 902 versus sample voltage of the partial transition 712 depicts zone boundaries 904 having a common slope. The sample voltage of the partial transition 712 repeats itself every period of the ring oscillator with track-and-hold circuit 804 of FIG. 8. Each of the interpolated delay cells 504 of FIG. 5 can have an integral non-linearity, which can be displayed as a variation in the TDC output time 902 from the zone boundaries 904 based on a similar sample voltage of the partial transition 712.

The integral non-linearity of the interpolated delay cells 504 can vary with changes in temperature and voltage. Each of the interpolated delay cells 504 in the ring oscillator with track-and-hold circuit 804 can be assigned the zone identification 212. In order to maintain the precision of the time-to-digital converter (TDC) unit 202 of FIG. 2, the variation of gain in each of the interpolated delay cells 504 must be compensated. The changes in gain of the interpolated delay cells 504 caused by temperature and voltage are gradual and can be tracked in order to adjust the time-to-digital converter (TDC) unit 202 for each of the zone identifications 212.

Figure 10:
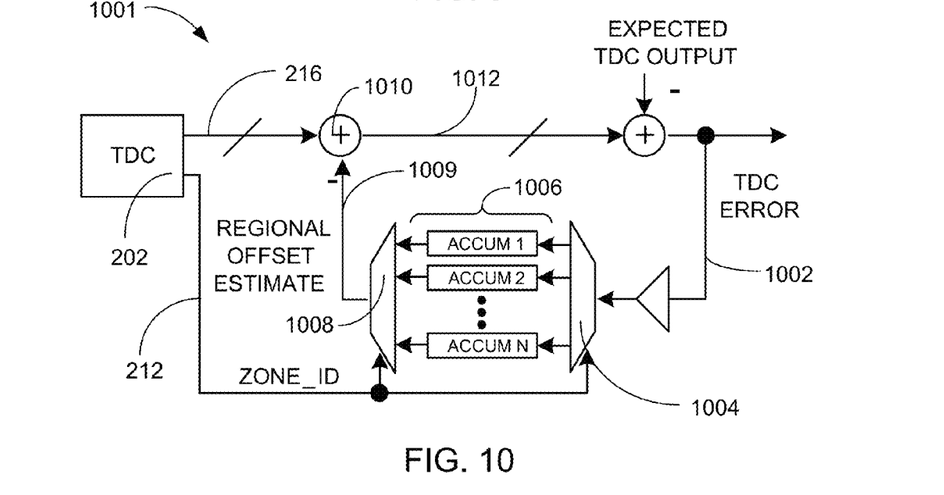
FIG. 10 is a functional block diagram of a gain tracking circuit for the time-to-digital converter (TDC) unit of FIG. 2.

Referring now to FIG. 10, therein is shown a functional block diagram of a gain tracking circuit 1001 for the time-to-digital converter (TDC) unit 202 of FIG. 2. The functional block diagram of the gain tracking circuit 1001 depicts the TDC unit 202 providing the zone identification 212 and the digital count 216 for interpreting the partial transition 712 of FIG. 7.

A time-to-digital converter (TDC) error 1002 can be a digital number that reflects the change in gain caused by the variation in voltage and temperature. The change in gain can impact the ring oscillator with track-and-hold circuit 804 of FIG. 8, the analog selection multiplexer 820 of FIG. 8, the storage capacitors 822 of FIG. 8, the analog-to-digital converter 824 of FIG. 8, or a combination thereof. As the temperature and voltage vary, the interpretation of the partial transition 712 can change. By tracking the variations of the time-to-digital converter (TDC) error 1002, it is possible to adjust the digital count 216 thereby resolving the integral non-linearity of the system.

An input selector 1004 can pass the time-to-digital converter (TDC) error 1002 to one of the zone error accumulators 1006 based on the zone identification 212. The zone error accumulators 1006 can collect residual for each of the interpolated delay cells 504 of FIG. 5 in the ring oscillator with track-and-hold circuit 804 of FIG. 8. The zone error accumulators 1006 can have registers one through N, where N is the number of the interpolated delay cells 504 that make up the ring oscillator with track-and-hold circuit 804.

An output multiplexer 1008 can be addressed by the zone identification 212 for passing the accumulated error of the selected zone identification 212. The output multiplexer 1008 can generate an offset count 1009, for each of the regions selected by the zone identification 212, that is electrically connected to an offset adder 1010, which can subtract the offset count 1009 from the digital count 216 for generating an adjusted timing count 1012. The adjusted timing count 1012 can be verified by a verification adder 1014, which can subtract an expected TDC output 1016 for generating the TDC error 1002.

It has been discovered that the adjusted timing count 1012 can provide a gain adjusted measure of the fine timing 230 of FIG. 2 by applying a time averaged adjustment to minimize the low frequency portion of the TDC error 1002. This aspect of the embodiment can provide a cancelling of the integral non-linearity associated with the ring oscillator with track-and-hold circuit 804 for providing a stable and consistent frequency synthesizer.

Figure 11:
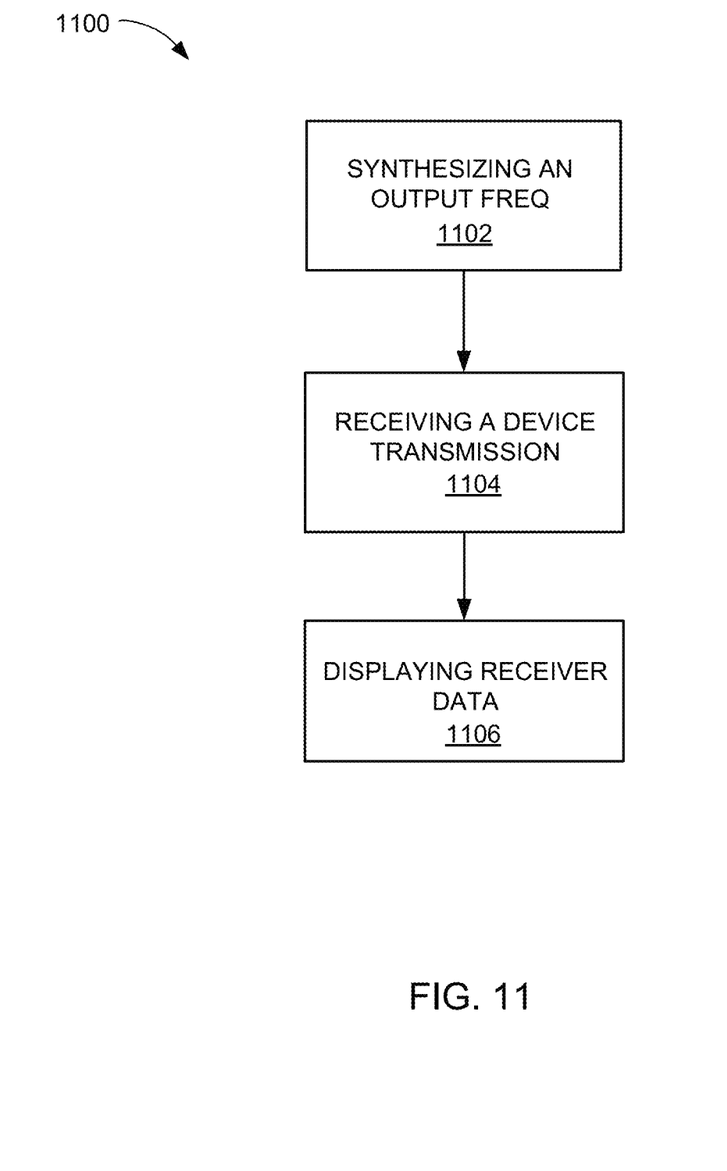
FIG. 11 is a flow chart of a method of operation of a communication system in an embodiment of the present invention.

Referring now to FIG. 11, therein is shown a flow chart of a method 1100 of operation of a communication system 100 in an embodiment of the present invention. The method 1100 includes: synthesizing an output frequency, in a device, for referencing a radio frequency (RF) signal including: enabling a ring oscillator with track-and-hold circuit by a reference clock, accessing a bank of comparators for measuring a coarse timing from the reference clock, and generating a fine timing by enabling an analog-to-digital converter (ADC) electrically connected to the ring oscillator with track-and-hold circuit in a block 1102; receiving a device transmission by referencing a communication interface with the output frequency in a block 1104; and displaying a receiver data, from the radio frequency (RF) signal, by a control unit in a block 1106.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:
1. A communication system comprising:
 a frequency synthesizer, configured to reference a radio frequency (RF) signal, including:
  a ring oscillator with track-and-hold circuit electrically connected to a reference clock,
  a bank of comparators, electrically connected to the ring oscillator with track-and-hold circuit, configured to measure a coarse timing from the reference clock, and
  an analog-to-digital converter, electrically connected to the ring oscillator with track-and-hold circuit, configured to generate a fine timing;
 a communication interface, electrically connected to the frequency synthesizer, configured to receive a device transmission; and a control unit, electrically connected to the communication interface, configured to display a receiver data from the a radio frequency (RF) signal.

2. The system as claimed in claim 1 wherein the ring oscillator with track-and-hold circuit includes an interpolated delay cell comprising two or more of a multi-input inverter with track-and-hold circuit.

3. The system as claimed in claim 1 wherein the bank of comparators includes a coarse encoder electrically connected to the ring oscillator with track-and-hold circuit for generating a cycle count.

4. The system as claimed in claim 1 wherein the analog-to-digital converter includes a feedback capacitor adjacent to the ring oscillator with track-and-hold circuit.

5. The system as claimed in claim 1 wherein the analog-to-digital converter includes an offset compensated comparator for selecting a partial transition in the ring oscillator with track-and-hold circuit.

6. The system as claimed in claim 1 wherein the frequency synthesizer includes a clock buffer, electrically connected to the ring oscillator with track-and-hold circuit, configured to clock a counter for determining a zone identification.

7. The system as claimed in claim 1 wherein the frequency synthesizer includes an analog-to-digital converter (ADC) gain tracking circuit electrically connected to an ADC adjust multiplier.

8. The system as claimed in claim 1 wherein the frequency synthesizer includes a time-to-digital converter (TDC) gain tracking circuit electrically connected to a TDC adjust multiplier.

9. The system as claimed in claim 1 wherein the frequency synthesizer includes a digitally controlled oscillator (DCO) configured to receive a coded measured timing through a loop filter.

10. The system as claimed in claim 1 wherein the ring oscillator with track-and-hold circuit includes a holding capacitor electrically connected to an resistively degenerated buffer controlled by an enable buffer line configured to generate a voltage input line.

11. A method of operation of a communication system comprising:

synthesizing an output frequency, in a device, for referencing a radio frequency (RF) signal including:
  enabling a ring oscillator with track-and-hold circuit by a reference clock,
  accessing a bank of comparators for measuring a coarse timing from the reference clock, and
  generating a fine timing by enabling an analog-to-digital converter (ADC) electrically connected to the ring oscillator with track-and-hold circuit;
receiving a device transmission by referencing a communication interface with the output frequency; and
displaying a receiver data, from the radio frequency (RF) signal, by a control unit.

12. The method as claimed in claim 11 wherein synthesizing the output frequency includes switching an interpolated delay cell comprising two or more of a multi-input inverter with track-and-hold circuit.

13. The method as claimed in claim 11 wherein measuring the coarse timing includes generating a cycle count.

14. The method as claimed in claim 11 wherein generating the fine timing includes charging a feedback capacitor by the ring oscillator with track-and-hold circuit.

15. The method as claimed in claim 11 wherein generating the fine timing includes selecting a partial transition.

16. The method as claimed in claim 11 wherein measuring the coarse timing includes determining a zone identification.

17. The method as claimed in claim 11 wherein synthesizing the output frequency includes scaling the fine timing by an ADC adjust multiplier.

18. The method as claimed in claim 11 wherein synthesizing the output frequency includes scaling the coarse timing by a time-to-digital converter (TDC) adjust multiplier.

19. The method as claimed in claim 11 wherein synthesizing the output frequency includes receiving a coded measured timing by a digitally controlled oscillator (DCO).

20. The method as claimed in claim 11 wherein enabling the ring oscillator with track-and-hold circuit includes charging a holding capacitor for generating a voltage input line.

* * * * *